United States Patent [19]
Minatono et al.

[11] 4,218,349
[45] Aug. 19, 1980

[54] RUBBER COMPOSITION

[75] Inventors: Shobu Minatono; Hideo Takamatsu, both of Kashima, Japan

[73] Assignee: Kuraray Co., Ltd., Kurashiki, Japan

[21] Appl. No.: 971,042

[22] Filed: Dec. 19, 1978

[51] Int. Cl.² ............................ C08L 7/00; C08L 9/00
[52] U.S. Cl. ..................................... 260/5; 260/31.8 J; 260/31.8 DR; 260/33.6 A; 260/759
[58] Field of Search .................. 260/5, 33.6 A, 31.8 J, 260/727, 759, 31.8 DR

[56] References Cited

U.S. PATENT DOCUMENTS

| | | | |
|---|---|---|---|
| 3,335,202 | 8/1967 | Giulio et al. | 260/889 |
| 3,507,838 | 8/1970 | Vervloet | 260/875 |
| 3,567,691 | 3/1971 | Van Breen et al. | 260/879 |
| 3,887,527 | 6/1975 | Okamura et al. | 526/56 |
| 3,898,193 | 8/1975 | Minatono et al. | 260/42.47 |
| 3,909,473 | 9/1975 | Okamura et al. | 260/23.7 M |

FOREIGN PATENT DOCUMENTS

| | | |
|---|---|---|
| 990439 | 4/1965 | United Kingdom . |
| 1111978 | 5/1968 | United Kingdom . |
| 1211795 | 11/1970 | United Kingdom . |
| 1404291 | 8/1975 | United Kingdom . |
| 1406935 | 9/1975 | United Kingdom . |

*Primary Examiner*—Wilbert J. Briggs, Sr.
*Attorney, Agent, or Firm*—Oblon, Fisher, Spivak, McClelland & Maier

[57] ABSTRACT

A rubber composition with improved processability and capable of affording a vulcanizate with improved properties including improved adhesion to a metal surface is disclosed. The composition comprises a modified liquid polyisoprene rubber and a natural rubber. The modified liquid polyisoprene rubber is an adduct of maleic anhydride or a derivative thereof with a liquid polyisoprene rubber with a cis-1,4 content of not less than 70% and a molecular weight of 8,000 to 100,000, the amount of said maleic anhydride or said derivative being 0.1 to 15 mol % per isoprene unit in said liquid polyisoprene rubber.

5 Claims, No Drawings

RUBBER COMPOSITION

BACKGROUND OF THE INVENTION

1. Field of the Invention

This invention relates to a natural rubber composition having improved properties in the unvulcanized state as well as in the vulcanized state. More particularly, the invention relates to a natural rubber composition comprising a natural rubber and a specified liquid polyisoprene rubber.

2. Description of the Prior Art

It is one of the recent trends in the rubber industry to use low molecular weight plasticizers such as process oil, lanolin and dioctyl phthalate so as to decrease the degree of plasticity of unvulcanized rubber compounds, to increase processability thereof for the purpose of labor- and energy-savings. The use of the above-mentioned low molecular weight plasticizers causes a decrease in the viscosity of unvulcanized rubber compounds and an increase in the flowability thereof; thus contributing greatly to labor- and energy-savings in the process of manufacture of rubber goods. The use of these plasticizers also decreases the mechanical properties, typically the green strength, for example, of rubber compounds in the unvulcanized state. This decrease in green strength causes difficulties in the molding step and at the same time a decrease in the properties of the vulcanizates, such as hardness and modulus, are inevitable, and therefore, the vulcanizates are not always satisfactory in for the manufacture of such rubber goods as belts, hoses, tires, rolls, vibration absorbers and rubber shoes, where severe and strict requirements are put forth with respect to performance of the products. Moreover, in cases where metal reinforcements are often used, such as in the case of belts, hoses, tires and vibration absorbers, the use of lower molecular weight plasticizers such as mentioned above is undesirable for reasons which concern adhesion to the metal. In general, vulcanizates containing these plasticizers are inferior to those which do not contain such plasticizers.

In order to solve this rather contradictory problem, namely simultaneously increasing flowability in the unvulcanized state and processability, green strength, a rubber composition has been proposed wherein a low molecular weight polyisoprene rubber with an intrinsic viscosity in the range of 0.1 to 1 incorporated as low molecular weight plasticizer into a solid rubber, cf. for example British Pat. No. 990,439; U.S. Pat. No. 3,335,202. Further, British Pat. No. 1,111,978 discloses polyisoprene rubbers having various intrinsic viscosity distributions between 0 and 20 dl/g. In these methods, however, the adhesion of the rubber to the metal reinforcements is not adequate.

Further, it is known to introduce a polar group, for example maleic anhydride, into a solid cis-1,4polyisoprene rubber in order to improve the green strength, cf. for example U.S. Pat. No. 3,567,691; U.S. Pat. No. 3,507,736; U.S. Pat. No. 3,664,248; U.S. Pat. No. 3,887,527; U.S. Pat. No. 3,909,473; U.S. Pat. No. 3,898,193; British Pat. No. 1,404,291; British Pat. No. 1,406,935 and British Pat. No. 1,211,795. These methods, also, are not fully satisfactory in respect to flowability and processability.

Natural rubber which has been used with large quantities possess excellent processability and mechanical properties. Especially, with respect to processability, no synthetic rubber yet produced is superior to the natural rubber. Certainly, cis-1,4-polyisoprene rubber (IR), which has a structure similar to that of natural rubber, is superior to other synthetic rubbers in processability, but even this rubber does not equal natural rubber in green strength which influences the processability. Green strength is the basic required property for handling an unvulcanized rubber compound. If the green strength is poor, the unvulcanized rubber compound will undergo the state of cold-flowing before vulcanization. Especially, in a case of manufacturing hard rubber articles such as tires or belts, still higher green strength is needed for the process of doubling for carcass or forming unvulcanized body for tires or belts.

As mentioned above, natural rubber has a high green strength. However, it is not satisfactory in all respects. Namely, in some cases as mentioned above, a higher green strength is desirable, and in the case of using plasticizers or softeners to improve the flowability of the rubber compound on calendering or extruding, the green strength decreases while the plasticity increases.

Thus, a need continues to exist for a natural rubber composition which is easy to work in the unvulcanized state and yet possess excellent properties when vulcanized physically.

SUMMARY OF THE INVENTION

Accordingly, a principal object of the invention is to provide a natural rubber composition having simultaneous improvement in flowability and processability in the unvulcanized state, in improved properties of its vulcanizates and in its adhesion to metallic materials.

According to the invention, it has been found that a rubber composition comprising a natural rubber and a liquid rubber which is an adduct of maleic anhydride or a derivative thereof and a liquid polyisoprene rubber with a cis-1,4 content of not less than 70% and a molecular weight of 8,000 to 100,000, the amount of said maleic anhydride or said derivative being 0.1 to 15 mol % per isoprene monomer unit in said liquid isoprene rubber, can achieve the above objects.

DETAILED DESCRIPTION OF THE INVENTION

Natural rubbers which may be used in the present invention include, SMR-5L, SMR-20, SMR-50, RSS#1, RSS#2, RSS#3, ADS or pale crepe. In order to produce a sufficient effect in relation to green strength, it is preferred that the Mooney viscosity (ML$_{1+4}$(100° C.)) of the natural rubber not be less than 35 and is not more than 130, and is most preferably 90. These natural rubbers may be used either alone or as a mixture of two or more of these. A small amount of a synthetic solid polydiene rubber may be incorporated. Such solid polydiene rubbers are synthetic rubbers with a molecular weight of at least 300,000 such as cis-1,4-polyisoprene rubber (IR), polybutadiene rubber (BR), styrene-butadiene copolymer rubber (SBR), styrene-isoprene copolymer rubber (SIR), acrylonitrile-butadiene copolymer rubber (NBR), acrylonitrile-isoprene copolymer rubber (NIR), isobutyleneisoprene copolymer rubber (IIR), and ethylene-propylene diene terpolymer (EPDM). Adjustment of the Mooney viscosity of a value within the above range can be made by mastication of the natural rubber on an open roll or Banbury mixer.

The liquid rubber to be used according to the invention, the molecular weight of the liquid polyisoprene rubber before modification, the cis-1,4 content thereof, and the type and amount of the added functional group are very important factors.

Preferably, the unmodified liquid polyisoprene rubber which is the base of said liquid rubber has a molecular weight in the range of 8,000 to 100,000, more preferably in the range of 15,000 to 55,000. When the molecular weight is much lower than 8,000, not only is improvement in the green strength small, but there is also a decrease in the cross-linking efficiency of the rubber composition containing a polydiene rubber in addition to the natural rubber; hence decrease in physical properties of the vulcanizate results. When the molecular weight is much higher than 100,000, the viscosity becomes too high to attain the objective of improved processability. The term "molecular weight" used herein means the viscosity-average molecular weight (abbreviated to "M") which is calculated from the following equation:

$$[\eta] = 1.21 \times 10^{-4} M^{0.77}$$

where $[\eta]$ is intrinsic viscosity as determined with toluene solutions at 30° C.

Moreover, it is necessary that the cis-1,4 content of the unmodified liquid polyisoprene rubber not be less than 70%, preferably not less than 80%. In case the cis-1,4 content is too low, the liquid polyisoprene rubber itself is already too rigid, and, in addition, not only processability is poor, but also the efficiency of vulcanization of the rubber composition is low and the properties of the vulcanizate are insufficient. The term "cis-1,4 content" used herein is the one as measured by infrared absorption spectrophotometry.

The unmodified liquid polyisoprene rubber with such specific molecular weight and microstructure can be prepared, for example, by anionic polymerization, free radical polymerization or coordination anionic polymerization of isoprene. It can also be prepared by thermal decomposition at a high temperature (e.g., 180° to 300° C.) of a natural rubber or a solid synthetic cis-1,4-polyisoprene rubber prepared in turn by Ziegler polymerization or anionic polymerization. The liquid polyisoprene rubber prepared by thermal decomposition, however, has a very strong smell or odor and is highly colored, due to byproducts of the thermal decomposition, and production of a thermal decomposition of a constant quality is difficult, hence such a thermal decomposition is not desirable procedure. Those liquid polyisoprene rubbers which are produced by anionic polymerization using a lithium calalyst are most preferred, because they do not contain a gel portion and show a ratio of (weight-average molecular weight)/(number-average molecular weight) of not more than 3 and a narrow range of molecular weight distribution.

Therefore, such anionic polymerization is now described in more detail. Isoprene monomer is polymerized by the use of metallic lithium or an organolithium such as methyl lithium, propyl lithium, butyl lithium or distyrenyl lithium as catalyst, in the presence or absence of a solvent. As is well known, the molecular weight of the polymer can easily be regulated by adjusting the ratio of the amount of isoprene monomer to that of the catalyst used. The use of a solvent facilitates the control of the polymerization, and therefore, is appropriate.

The derivatives of maleic anhydride to be used in practicing the invention include maleic acid, mono- and di-esters of maleic acid, maleamide and maleimide.

The addition reaction of maleic anhydride or a derivative thereof to the liquid polyisoprene rubber can easily be carried out, for example by adding maleic anhydride or a derivative thereof to a liquid polyisoprene rubber with a molecular weight falling within the above specified range and heating the mixture in the presence or absence of a solvent and in the presence or absence of a radical initiator. The solvent usable herein is generally a hydrocarbon, a halogenated hydrocarbon or the like, and preferably such an inert solvent as n-butane, n-hexane, n-heptane, cyclohexane, benzene, toluene or xylene.

Besides those adducts of maleic anhydride or a derivative thereof that are obtained by reaction of a liquid rubber prepared in the manner mentioned above with maleic anhydride and/or a derivative thereof such as maleic acid, a maleate, maleamide or maleimide, products derived from the adduct of a liquid polyisoprene rubber and maleic anhydride by esterifying, amidating or imidating one or both of the carboxyl groups originating from the maleic anhydride with an alcohol, such as methanol, ethanol or n-propanol, or ammonia or an amine such as n-propylamine or n-butylamine, in the presence or absence of a catalyst, such as p-toluenesulfonic acid, according to circumstances, are also generally used. In consideration of the viscosity stability in the case where the modified liquid rubber is stored for a long period of time, alcohol derivatives or amine derivatives of the modified liquid polyisoprene rubber are preferred to the maleic-anhydride-modified liquid polyisoprene rubber itself. However, a neutralized carboxylated liquid polyisoprene rubber obtained from the adduct of a liquid polyisoprene rubber and maleic anhydride by neutralizing the carboxyl groups originating from the maleic acid with the hydroxide of metal such as potassium, sodium, barium, calcium and aluminum cannot be used in the present composition because the derivative aforementioned itself is inclined to become gelled or completely crosslinked and do not contribute in the improvement for the flowability and processability of composition.

Since the amount of maleic anhydride or a derivative thereof added to a liquid polyisoprene rubber has an influence upon the properties of the finally obtained vulcanizate, it is important that said amount is in the range of 0.1 to 15 mol %, peferably in the range of 0.5 to 10 mol %, per isoprene monomer unit. With an excessively small amount of maleic anhydride or a derivative thereof, the desired simultaneous improvement in processability, hardness of the vulcanizate and adhesion to metals cannot be produced. On the other hand, with an excessively large amount, decrease in processability and in properties of the vulcanizate is observed, supposedly due to the formation of a heterogeneous system at the time of mixing with the natural rubber.

According to the invention, the preferred amount of the liquid rubber is 5 to 45% by weight, preferably 10 to 30% by weight, of the total amount of the natural rubber and the liquid rubber. Excessively small or large amounts of the liquid rubber produce less effect on the green strength as illustrated hereinafter. Moreover, when the amount of the liquid rubber is too large, remarkable deterioration in properties of the vulcanizate results in addition to the problem mentioned above.

The rubber composition of the present invention may contain, in addition to the natural rubber and the liquid rubber, a variety of rubber additives. Typical examples of such additives are vulcanizing or curing agents such as sulfur and peroxides, vulcanization accelerators, activators such as zinc oxide, magnesium oxide and stearic acid, fillers such as carbon black, clay, calcium carbonate, surface-treated calcium carbonate, silica, hydrated silicates, pulverized mica, talc and pulverized asbestos, plasticizers such as process oil and other liquid rubbers, antioxidants, and ultraviolet degradation inhibitors. In accordance with the invention, the natural rubber may be used alone or as a mixture of two or more of them. Furthermore, the natural rubber may be replaced partly by some other rubber or plastic material, so long as the object of the invention can be accomplished. Further, metallic materials such as steel, brass, brass-plated steel, zinc, zinc-plated steel, chrome-plated steel, copper and aluminum may be used in the form of plates, cords or powders as reinforcements.

The rubber composition of the present invention is produced on an apparatus conventional in the rubber industry in general, such as roll mill, Banbury mixer, kneader or some other internal mixer.

The rubber composition of the invention is especially suitable for the manufacture of steel-reinforced radial tires, steel-reinforced conveyor belts, steel-reinforced rubber hoses and other products that have to meet especially severe requirements set out with respect to their properties. The rubber composition of the invention with a white filler added, such as clay, silica or calcium carbonate, is suitable for the manufacture of rubber shoes and other rubber goods for industrial use, for instance, because such rubber composition, when vulcanized, produces a remarkably improved reinforcing effect in respect of hardness and modulus of the vulcanizate.

Having generally described this invention, a further understanding can be obtained by reference to certain specific examples which are provided herein for purposes of illustration only and are not intended to be limiting unless otherwise specified.

EXAMPLE 1 AND EXAMPLE FOR COMPARISON -1

A liquid polyisoprene rubber with a molecular weight of 35,000 and a cis-1,4 content as measured by infrared absorption spectrophotometry of 85% was prepared by polymerization of monomeric isoprene in n-heptane in the presence of secondary butyl lithium as catalyst. The liquid polyisoprene rubber (100 parts by weight) was dissolved in toluene, and 5 parts by weight of maleic anhydride was added, and the mixture was stirred with heating at 150° C. and then poured into acetone. The resulting precipitate was dried, giving a modified liquid polyisoprene rubber (MAn-LIR[A]) which contained 0.7 mole of maleic anhydride per 100 isoprene units. Using this modified liquid rubber MAn-LIR[A] or a process oil and according to the recipe in Table 1, three rubber compounds were prepared on a roll mill. The Mooney viscosity and green strength of each compound, the hardness of the vulcanizate and the vulcanizate-brass plate bond strength were as shown in Table 1.

TABLE 1

| Compound | I - A | I - B* | I - C |
|---|---|---|---|
| Natural rubber RSS #3 | 100 | 80 | 80 |
| MAn-LIR[A] | — | 20 | — |
| Process oil[1] | — | — | 20 |
| Carbon black GPF[2] | 45 | 45 | 45 |
| Zinc oxide | 5 | 5 | 5 |
| Stearic acid | 1 | 1 | 1 |
| Sulfur | 0.8 | 0.8 | 0.8 |
| Accelerator NS[3] | 2.2 | 2.2 | 2.2 |
| Antioxidant NS-6[4] | 1 | 1 | 1 |
| Mooney viscosity of compound $ML_{1+4}$ (100° C.) | 61 | 32 | 30 |
| Green strength[5] (kg/cm$^2$) | 2.9 | 4.1 | 1.9 |
| Hardness of vulcanizate[6] | 62 | 65 | 57 |
| Vulcanizate-plate brass bond[7] strength (g/cm) | 327 | 1,310 | 457 |

Notes:
*Compound in accordance with the invention
[1]Sunthene 450 (Sun Oil Company)
[2]Product of Mitsubishi Chemical Industries Ltd.

As is clear from Table 1, compound I-B according to the invention where a natural rubber was combined with the modified liquid polyisoprene rubber showed a decreased Mooney viscosity, an improved flowability and a high green strength and at the same time brought about a high vulcanizate-brass plate bond strength. In other words, the performance of the composition of the invention was sufficient in respect of flowability and processability in the unvulcanized state, properties of the vulcanizate as well as bond strength of the vulcanizate to the metal. On the contrary, compound I-C where a process oil was used showed a much decreased green strength, although it showed a decreased Mooney viscosity and an improved flowability; decrease in bond strength to the brass plate resulted, too.

EXAMPLE 2 AND EXAMPLE FOR COMPARISON -2

Three polyisoprene rubber with molecular weights of 3,000, 35,00 and 230,000, respectively, and each with a cis-1,4 content as measured by infrared absorption spectrophotometry of about 85% were prepared by polymerization of isoprene monomer in n-heptane as solvent with the amount of sec-butyl lithium varied. Each of these polyisoprene rubbers was dissolved in toluene, maleic anhydride was added in an amount of 5 parts by weight per 100 parts of the polyisoprene rubber, the mixture was heated at 150° C. with stirring and then poured into acetone, and the reaction product that precipitated was collected and dried, to give a modified polyisoprene rubber with a bound maleic anhydride content of about 0.7 mol %. Using these modified polyisoprene rubbers, three rubber compounds were prepared according to recipe I-B in Example 1. The Mooney viscosity and green strength of each compound, the hardness of the vulcanizate and the vulcanizate-plate brass bond strength were as shown in Table 2.

TABLE 2

| Compound | II - A | II - B* | II - C |
|---|---|---|---|
| Molecular weight of polyisoprene before modification | 3,000 | 35,000 | 230,000 |
| Mooney viscosity of compound $ML_{1+4}$ (100° C.) | 32 | 32 | 70 |
| Green strength (kg/cm$^2$) | 1.9 | 4.1 | 4.5 |
| Hardness of vulcanizate (JIS A) | 57 | 65 | 63 |
| Vulcanizate-plate brass bond strength (g/cm) | 711 | 1,310 | 631 |

*Compound in accordance with the invention

As can be seen in Table 2, compound II-B where the modified liquid polyisoprene rubber having a molecular weight falling within the range specified by the invention was used showed a markedly decreased Mooney viscosity in the unvulcanized state and a high green strength, and produced a vulcanizate with a sufficient hardness and a high vulcanizate-plate brass bond strength. On the other hand, compound II-A which contained a modified liquid polyisoprene rubber with a molecular weight below said specific range showed a good flowability but a low green strength, and produced a low vulcanizate-plate brass bond strength. Compound II-C that contained a modified polyisoprene rubber with a molecular weight exceeding said range did not reveal desirable improvement in flowability and in vulcanizate-metal bond strength.

EXAMPLE 3 AND EXAMPLE FOR COMPARISON -3

A liquid polyisoprene rubber with a molecular weight of 35,000 and a cis-1,4 content of 85% was prepared in the same manner as in Example 1. This liquid polyisoprene rubber was dissolved in toluene, and maleic anhydride was added in amounts of 0.5, 5 and 30 parts by weight per 100 parts by weight of said liquid polyisoprene rubber, respectively. After heating each mixture at 150° C. with stirring, the mixture was poured into acetone. The reaction product that precipitated was collected and dried. Modified liquid polyisoprene rubbers with contents of bound maleic anhydride of 0.05, 0.7 and 19.0 mol %, respectively, were obtained. Three rubber compounds were prepared on a roll mill, according to the recipe of compound I-B in Example 1, but using the three modified liquid polyisoprene rubbers as plasticizers. The Mooney viscosity and green strength of each compound, the hardness of the vulcanizate and the vulcanizate-plate brass bond strength were as shown in Table 3.

TABLE 3

| Compound | III - A | III - B* | III - C |
|---|---|---|---|
| Bound maleic anhydride content in modified liquid polyisoprene rubber (mol %) | 0.05 | 0.7 | 19.0 |
| Mooney viscosity of compound $ML_{1+4}$ (100° C.) | 31 | 32 | 69 |
| Green strength (kg/cm$^2$) | 2.0 | 4.1 | 4.2 |
| Hardness of vulcanizate (JIS A) | 57 | 65 | 59 |
| Vulcanizate-plate brass bond strength (g/cm) | 478 | 1,310 | 298 |

*Compound according to the invention

It is noted from Table 3 that compound III-B which contained a modified liquid polyisoprene rubber with a bound maleic anhydride content falling within the range specified by the invention successfully achieved the object of the invention. On the other hand, compound III-A which contained a modified liquid polyisoprene rubber whose bound maleic anhydride content was smaller than the lower limit of said range caused a low green strength and a low vulcanizate-plate brass bond strength, whereas compound III-C which contained a modified liquid polyisoprene rubber with a bound maleic anhydride content greater than the upper limit of said range showed only an insufficient decrease in Mooney viscosity and produced a low vulcanizate-plate brass bond strength.

EXAMPLE 4 AND EXAMPLE FOR COMPARISON -4

A liquid polyisoprene rubber (LIR[B]) with a molecular weight of 51,000 and a cis-1,4 content as measured by infrared absorption spectrophotometry of 82% was prepared by polymerizing monomeric isoprene in the presence of sec-butyl lithium, with n-heptane used as solvent. Separately, a liquid polyisoprene rubber (LIR[C]) with a molecular weight of 57,000 and a cis-1,4 content of 42% was prepared by polymerization in the presence of diethyl ether and butyl lithium. Both the liquid polyisoprene rubbers were each dissolved in xylene, maleic acid was added to the solution in an amount of 7 parts by weight per 100 parts by weight of the liquid polyisoprene rubber, the mixture was heated at 160° C. with stirring, ethanol was then added, the whole mixture was pured into acetone, and the precipitate was collected and dried. There were obtained modified liquid polyisoprene rubbers, designated, respectively, as E-MAn-LIR[B] and E-MAn-LIR[C], each with an ethyl maleate content of 3.8 mol %. In accordance with the recipe shown in Table 4 rubber compounds were prepared on a kneader using said modified liquid polyisoprene rubbers. The Mooney viscosity and green strength of each compound, the hardness of the vulcanizate and the vulcanizate-plate brass bond strength were as shown in Table 4.

TABLE 4

| Compound | IV - A | IV - B* | IV - C* | IV - D |
|---|---|---|---|---|
| Natural rubber SMR-5L | 100 | 90 | 80 | 80 |
| E-MAn-LIR[B] | — | 10 | 20 | — |
| E-MAn-LIR[C$\pi$] | — | — | — | 20 |
| Process oil[1] | 3 | 3 | 3 | 3 |
| Carbon black FEF[2] | 45 | 45 | 45 | 45 |
| Zinc oxide | 6 | 6 | 6 | 6 |
| Stearic acid | 1 | 1 | 1 | 1 |
| Sulfur | 2 | 2 | 2 | 2 |
| Accelerator MSA[3] | 1 | 1 | 1 | 1 |
| Antioxidant RD[4] | 1 | 1 | 1 | 1 |
| Cobalt naphthenate | 3 | 3 | 3 | 3 |
| Mooney viscosity of compound $ML_{1+4}$ (100° C.) | 65 | 60 | 53 | 72 |
| Green strength (kg/cm$^2$) | 8.9 | 12.7 | 13.9 | — |
| Hardness of vulcanizate[5] (JIS A) | 64 | 66 | 68 | 59 |
| Vulcanizate-plate brass bond[5] strength | Interface peeling between rubber & metal | Break in rubber layer | Break in rubber layer | |

Notes:
*Compounds according to the invention
[1]Sunthene 450 (Sun Oil Company)
[2]Manufactured by Mitsubishi Chemical Industries Ltd.
[3]Nocceler MSA: N,N-oxydiethylene-2-benzothiazolyl sulfenamide (Ouchi-Shinko Chemical Industrial Co., Ltd.
[4]Antigene RD: polymer of 2,2,4-trimethyl-1,2-dihydroquinoline (Sumitomo Chemical Co., Ltd.
[5]Vulcanization conditions: 145° C., 25 minutes It can be seen from Table 4, that, even if the base rubbers for the preparation of modified liquid polyisoprene rubbers have approximately the same molecular weight, the Mooney viscosity and green strength of the rubber composition comprising a natural rubber and a modified liquid polyisoprene rubber, the hardness of the vulcanizate and the vulcanizate-plate brass bond strength are greatly influenced by difference in cis-1,4 content among said base rubbers. Thus, compounds IV-B and IV-C where modified liquid rubber E-MAn- LIR[B] based on a liquid polyisoprene rubber with a cis-1,4 content of 82% was incorporated each had a Mooney viscosity lowered sufficiently for processing as well as an improved green strength, and at the same time, the vulcanizate thereof had an improved hardness and the vulcanizate-plate brass bond did not show interface peeling but showed good adhesion. On the other, compound IV-D which contained modified liquid rubber E-MAn-LIR[C] based on a liquid polyisoprene rubber with a cis-1,4 content of 42% showed a high Mooney viscosity and bad processability, and the vulcanization had a decreased hardness.

EXAMPLE 5 AND EXAMPLE FOR COMPARISON –5

Using the same modified liquid polyisoprene rubber as that used in Example 1, rubber compounds were prepared on a roll mill according to the recipes shown in Table 5. The compounds were evaluated in terms of Mooney viscosity and green strength, in hardness and stress at 300% elongation of the vulcanizate, and in the vulcanizate-chrome-plated steel bond strength (Table 5). Table 5 shows that the use of the modified liquid polyisoprene rubber improved the processability as well as the hardness of the vulcanizate and the vulcanizate-metal bond strength and so on all at once.

TABLE 5

| Compound | V - A | V - B* | V - C* |
|---|---|---|---|
| Natural rubber RSS #1 | 90 | 70 | 55 |
| Modified liquid polyisoprene | — | 20 | 20 |
| SBR-1500[1] | 10 | 10 | 25 |
| Clay | 130 | 130 | 130 |
| Zinc oxide | 5 | 5 | 5 |
| Stearic acid | 3 | 3 | 3 |
| Sulfur | 3 | 3 | 3 |
| Accelerator DM[2] | 1.1 | 1.1 | 1.1 |
| Accelerator DT[3] | 0.4 | 0.4 | 0.4 |
| Dicyclohexylamine | 1.1 | 1.1 | 1.1 |
| Antioxidant NS-6 | 1 | 1 | 1 |
| Mooney viscosity of compound $ML_{1+4}$ (100° C.) | 37 | 25 | 31 |
| Green strength (kg/cm$^2$) | 0.7 | 1.3 | 1.2 |
| Hardness of vulcanizate (JIS A) | 64 | 73 | 70 |
| Stress at 300% elongation[4] (kg/cm$^2$) | 78 | 12 | 98 |
| Vulcanizate-chrome-plated steel bond strength | Interface peeling between rubber & metal | Break in rubber layer | Break in rubber layer |

Notes:
*Compound according to the invention
[1]Styrene-butadiene copolymer rubber with a styrene content of 23.5% (Mooney viscosity: 52) (Japanese Synthetice Rubber Co., Ltd.)
[2]Nocceler DM: dibenzothiazyl disulfide (Ouchi-Shinko Chemical Industrial Co., Ltd.)
[3]Nocceler DT: di-ortho-tolylguanidine (Ouchi-Shinko Chemical Industrial Co., Ltd.)
[4]Stress at 300% elongation of the vulcanizate according to JIS K 6301

EXAMPLE 6 AND EXAMPLE FOR COMPARISON –6

A liquid polyisoprene rubber with a molecular weight of 27,000 and a cis-1,4 content of 81% was prepared in the same manner as in Example 1. This liquid polyisoprene rubber was dissolved in toluene 10 parts by weight of maleic anhydride per 100 parts of the above rubber was added, the mixture was heated at 190° C. with stirring, then ammonia was passed through the reactor, and the reaction mixture poured into acetone. The precipitate was dried, and there was obtained a modified liquid polyisoprene rubber with a bound maleamide content of 4.1 mol %. Using this modified liquid polyisoprene rubber, said unmodified liquid polyisoprene rubber or a process oil, rubber compounds as shown in Table 6 were prepared on a roll mill.

As is clear from Table 6, the use of the modified liquid rubber improved the processability and the hardness of the vulcanizate and further the vulcanizate-metal bond strength in comparison with the case where the process oil was used. Moreover, when the unmodified liquid polyisoprene rubber was used, decrease in the hardness resulted, and the vulcanizate-metal adhesion improving effect was though appreciable, not so significant as in the case where the modified liquid polyisoprene rubber was used.

TABLE 6

| Compound | VI - A | VI - B | VI - C* |
|---|---|---|---|
| Natural rubber RSS #3[1] | 85 | 85 | 85 |
| Process oil | 15 | — | — |
| Unmodified liquid polyisoprene rubber | — | 15 | — |
| Modified polyisoprene rubber | — | — | 15 |
| Carbon black GPF | 30 | 30 | 30 |
| Carbon black FEF | 20 | 20 | 20 |
| Zinc oxide | 5 | 5 | 5 |
| Stearic acid | 3 | 3 | 3 |
| Sulfur | 2.8 | 2.8 | 2.8 |
| Accelerator NS | 1 | 1 | 1 |
| Cobalt naphthenate | 3 | 3 | 3 |
| Antioxidant NS-6 | 1 | 1 | 1 |
| Mooney viscosity of compound $ML_{1+4}$ (100° C.) | 54 | 55 | 58 |
| Green strength (kg/cm$^2$) | 6.0 | 9.2 | 15.8 |
| Hardness of vulcanizate[2] (JIS A) | 58 | 62 | 70 |
| Adhesion of vulcanizate with zinc-plated steel plate, peel strength[2] (kg/cm) | 0.8 | 1.4 | 3.5 |

Notes:
*Compound according to the invention
[1]Mooney viscosity $ML_{1+4}$ (100° C.) = 71
[2]Vulcanization conditions: 145° C., 30 minutes

Having now fully described this invention, it will be apparent to one or ordinary skill in the art that many changes and modifications can be made thereto without departing from the spirit or scope of the invention set forth herein.

What is claimed as new and intended to be covered by Letters Patent is:

1. A rubber composition comprising 5 to 45% by weight of a modified liquid rubber and 95 to 55% by weight of a natural rubber based on the total content of modified liquid rubber and natural rubber, said modified liquid rubber being an adduct of maleic anhydride or a derivative thereof with a liquid polyisoprene rubber with a cis-1,4 content of not less than 70% and a molecular weight of 8,000 to 100,000, said maleic anhydride or said derivative being present in an amount of 0.1 to 15 mol % per isoprene unit in said liquid polyisoprene rubber.

2. The rubber composition of claim 1, wherein said liquid polyisoprene rubber has a cis-1,4 content of not less than 80% and a molecular weight of 15,000 to 55,000.

3. The rubber composition of claim 1, wherein said modified liquid rubber is an adduct of a liquid polyisoprene rubber with maleic anhydride or a derivative thereof in an amount of 0.5 to 10 mol % per isoprene unit in said liquid polyisoprene rubber.

4. The rubber composition of claims 1, 2 or 3, wherein said rubber compositions contain from 5 to 45% by weight of a modified liquid rubber, 95 to 55% by weight of a natural rubber and up to 35% by weight of a synthetic rubber having a molecular weight greater than 300,000 said percentages by weight based on the total content of modified liquid rubber, natural rubber and synthetic rubber.

5. The rubber composition of claims 1 or 2, wherein said natural rubber has a Mooney viscosity of from 35 to 130.

* * * * *